(12) United States Patent
Yoshida

(10) Patent No.: US 10,603,879 B2
(45) Date of Patent: Mar. 31, 2020

(54) SHOCK ABSORPTION STRUCTURE AND VEHICLE OUTER PANEL MEMBER HAVING THE SAME

(71) Applicant: Nissan Motor Co., Ltd., Kanagawa (JP)

(72) Inventor: Takeshi Yoshida, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 15/303,141

(22) PCT Filed: Apr. 11, 2014

(86) PCT No.: PCT/JP2014/060507
§ 371 (c)(1),
(2) Date: Oct. 10, 2016

(87) PCT Pub. No.: WO2015/155889
PCT Pub. Date: Oct. 15, 2015

(65) Prior Publication Data
US 2017/0028690 A1    Feb. 2, 2017

(51) Int. Cl.
*B32B 7/02*    (2019.01)
*B32B 27/12*   (2006.01)
(Continued)

(52) U.S. Cl.
CPC ............... *B32B 27/12* (2013.01); *B32B 5/00* (2013.01); *B32B 5/02* (2013.01); *B32B 5/10* (2013.01);
(Continued)

(58) Field of Classification Search
CPC .... B32B 5/00; B32B 5/02; B32B 5/10; B32B 5/24; B32B 5/245; B32B 7/00;
(Continued)

(56) References Cited

U.S. PATENT DOCUMENTS 4,400,425 A    8/1983   Vanha
8,956,711 B2   2/2015   Musaefendic
(Continued)

FOREIGN PATENT DOCUMENTS

CN    1902046 A    1/2007
CN    201343004 Y  11/2009
(Continued)

OTHER PUBLICATIONS

Machine Translation of JP 2008-284918.*
(Continued)

*Primary Examiner* — Prashant J Khatri
*Assistant Examiner* — Zachary M Davis
(74) *Attorney, Agent, or Firm* — Osha Liang LLP

(57) ABSTRACT

A shock absorption structure has an exterior member made of a first fiber-reinforced composite material, an interior member made of a second fiber-reinforced composite material, and a first intermediate member made of resin, extending along the exterior member and the interior member, and sandwiched between the exterior member and the interior member. The first intermediate member has a lower elongation percentage than the exterior member. The first intermediate member has lower strength than the exterior member.

7 Claims, 5 Drawing Sheets

(51) Int. Cl.
| | |
|---|---|
| B32B 5/24 | (2006.01) |
| B32B 27/06 | (2006.01) |
| B32B 27/08 | (2006.01) |
| B32B 27/20 | (2006.01) |
| B32B 5/10 | (2006.01) |
| B32B 7/12 | (2006.01) |
| B32B 5/00 | (2006.01) |
| B32B 7/00 | (2019.01) |
| B32B 9/04 | (2006.01) |
| B32B 5/22 | (2006.01) |
| B32B 7/04 | (2019.01) |
| B32B 9/00 | (2006.01) |
| B32B 27/00 | (2006.01) |
| B32B 27/38 | (2006.01) |
| B32B 5/28 | (2006.01) |
| B32B 5/02 | (2006.01) |
| B62D 21/15 | (2006.01) |
| B62D 25/00 | (2006.01) |

(52) U.S. Cl.
CPC ............ *B32B 5/22* (2013.01); *B32B 5/24* (2013.01); *B32B 5/245* (2013.01); *B32B 5/28* (2013.01); *B32B 7/00* (2013.01); *B32B 7/02* (2013.01); *B32B 7/04* (2013.01); *B32B 7/12* (2013.01); *B32B 9/00* (2013.01); *B32B 9/04* (2013.01); *B32B 27/00* (2013.01); *B32B 27/06* (2013.01); *B32B 27/065* (2013.01); *B32B 27/08* (2013.01); *B32B 27/20* (2013.01); *B32B 27/38* (2013.01); *B62D 21/15* (2013.01); *B62D 25/00* (2013.01); *B32B 2250/00* (2013.01); *B32B 2250/40* (2013.01); *B32B 2260/021* (2013.01); *B32B 2260/023* (2013.01); *B32B 2260/046* (2013.01); *B32B 2262/00* (2013.01); *B32B 2262/101* (2013.01); *B32B 2262/106* (2013.01); *B32B 2307/50* (2013.01); *B32B 2307/51* (2013.01); *B32B 2307/546* (2013.01); *B32B 2307/558* (2013.01); *B32B 2307/56* (2013.01); *B32B 2307/732* (2013.01); *B32B 2605/00* (2013.01); *B32B 2605/08* (2013.01)

(58) Field of Classification Search
CPC ... B32B 7/02; B32B 2250/03; B32B 2250/04; B32B 2250/40; B32B 2307/50; B32B 2307/51; B32B 2307/546; B32B 2250/225; B61D 21/15; B61D 25/10; B60R 19/02; B60R 2019/1853; F61F 7/12; F61F 7/123; F61F 7/128; F61F 2236/06
USPC ........................................................ 180/271
See application file for complete search history.

(56) References Cited

U.S. PATENT DOCUMENTS

| | | |
|---|---|---|
| 2007/0148486 A1 | 6/2007 | Musaefendic |
| 2008/0185874 A1 | 8/2008 | Kimoto et al. |

FOREIGN PATENT DOCUMENTS

| | | | |
|---|---|---|---|
| CN | 101767556 A | | 7/2010 |
| CN | 102785627 A | | 11/2012 |
| JP | H06-91816 A | | 4/1994 |
| JP | 2004-076805 A | | 3/2004 |
| JP | 2005-238837 A | | 9/2005 |
| JP | 2005-289056 A | | 10/2005 |
| JP | 2008-213437 A | | 9/2008 |
| JP | 2008284918 A | * | 11/2008 |
| JP | 2010-089394 A | | 4/2010 |
| JP | 2012-131335 A | | 7/2012 |
| JP | 2014-201143 A | | 10/2014 |

OTHER PUBLICATIONS

Machine Translation of JP 2004-076805.*
Markarian, Jennifer; "Mineral modifiers fill the gap—keeping costs down without losing quality"; Jul./Aug. 2007; Plastics Additives & Compounding; pp. 20-25.*
International Preliminary Report on Patentability from PCT/JP2014/060507 dated Apr. 2, 2015 (3 pages).

* cited by examiner

SHOCK ABSORPTION STRUCTURE AND VEHICLE OUTER PANEL MEMBER HAVING THE SAME

BACKGROUND

Technical Field

The present invention relates to a shock absorption structure and a vehicle outer panel member having the same.

Background Art

Patent Literature 1 discloses a hood in which multiple columnar ribs are arranged between an outer panel and an inner panel which are made of a fiber-reinforced plastic. When impact force is applied to the outer panel, the hood absorbs energy by causing the multiple ribs to break.

CITATION LIST

Patent Literature

Patent Literature 1: Japanese Patent Application Publication No. 2012-131335

SUMMARY

In the hood described above, the multiple ribs break to absorb energy.

However, since the ribs each have a columnar shape, a large bonding area cannot be provided between the ribs and the outer panel or the inner panel. Accordingly, there is a risk of decrease in flexural rigidity of the hood.

One or more embodiments of the present invention provides a shock absorption structure and a vehicle outer panel member having this structure which can improve flexural rigidity and increase the energy absorption amount.

A shock absorption structure according to one or more embodiments of the present invention includes an intermediate member which extends along an exterior member made of a first fiber-reinforced composite material and an interior member made of a second fiber-reinforced composite material and which is sandwiched between the exterior member and the interior member, wherein the intermediate member has a lower elongation percentage than the exterior member and has lower strength than the exterior member.

A vehicle outer panel member according to one or more embodiments of the present invention has the shock absorption structure described above.

In the shock absorption structure described above, since the intermediate member extends along the exterior member and the interior member and is sandwiched between these members, the cross-sectional area of the shock absorption structure increases compared to the case where the shock absorption structure includes only the exterior member and the interior member. Hence, the flexural rigidity of the shock absorption structure as a whole increases. Moreover, the intermediate member has a lower elongation percentage than the exterior member and has lower strength than the exterior member. When these members are bent and deformed integrally as a whole by an impact load toward the interior member inputted to the exterior member, elongating deformation occurs in the exterior member, the interior member, and the intermediate member. However, in this deformation, since the intermediate member has a lower elongation percentage and strength than the exterior member, the intermediate member yields to the elongating deformation and breaks before the exterior member does. In other words, the flexural rigidity of the shock absorption structure as a whole is maintained at a high level in a period from the start of input of the impact load to the breakage of the intermediate member. Then, after the intermediate member breaks to absorb the energy, the flexural rigidity of the shock absorption structure as a whole is maintained until the exterior member or the interior member breaks, due to the size of the cross-sectional area formed by the exterior member, the interior member, and the intermediate member. Hence, the shock absorption structure can efficiently absorb more energy.

DETAILED DESCRIPTION

Description is given below of embodiments of the present invention with reference to the drawings. Note that the drawings are schematic and relationships, ratios, and the like among dimensions may be different from the actual ones. Moreover, terms indicating directions such as "up" and "down" in the following description are defined for the sake of convenience of describing positional relationships among portions, and do not limit the actual attachment orientation and the like. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

The embodiments described below are examples in which a shock absorption structure according to one or more embodiments of the present invention is applied to a bonnet or an engine hood (hereafter, simply referred to as hood) of an automobile. The shock absorption structure according to one or more embodiments of the present invention can be employed not only in a hood of an automobile but also to other vehicle outer panel members such as a door panel, a bumper, a trunk lid, a rear gate, a fender panel, a side body panel, and a roof panel.

Figure 1:
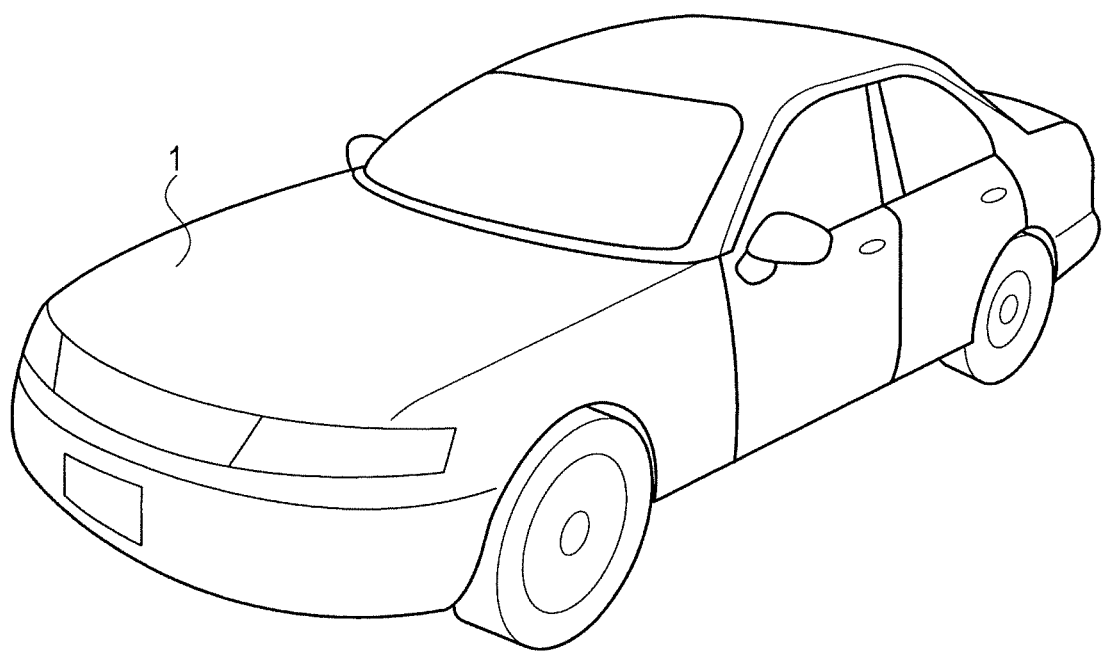
FIG. 1 is a perspective view of a hood having a shock absorption structure according to one or more embodiments of the present invention.
Figure 2:
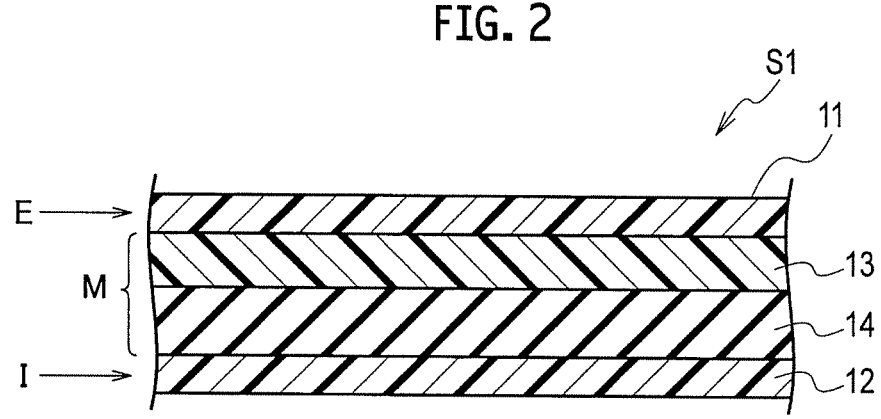
FIG. 2 is a cross-sectional view of a hood having a shock absorption structure in a first embodiment of the present invention.

FIG. 1 is a perspective view of a hood 1 having a shock absorption structure S1 according to one or more embodiments of the present invention. FIG. 2 is a cross-sectional view of the hood 1 according to a first embodiment of the present invention.

As illustrated in FIG. 1, the hood 1 covers an engine room and the like provided in a front portion of a vehicle 2 such as an automobile.

As illustrated in FIG. 2, the hood 1 has, as the shock absorption structure S1, an exterior member 11, an interior member 12 which is arranged opposite to the exterior member 11, and an intermediate member 13 and a second intermediate member 14 which are arranged between the exterior member 11 and the interior member 12.

The exterior member 11 is a sheet member which forms an exterior surface layer E of the hood 1 and which is made of a carbon-fiber-reinforced plastic. It is possible to set the thickness of the exterior member 11 to, for example, 0.8 to 1.0 mm, and set the breaking elongation percentage (hereafter, simply referred to as "elongation" or "elongation percentage") thereof to, for example, 1.5% to 2.0%. It is possible to set the tensile strength of the exterior member 11 to, for example, 300 to 1000 MPa and set the compressive strength thereof to, for example, 240 to 800 MPa. Note that the thickness, the elongation percentage, the strength, and the like of the exterior member 11 are not limited to the values described above and can be set, through experiments and the like, to values at which, in collision with an impactor F to be described later, the exterior member 11 breaks at a point where the second intermediate member 14 is sufficiently crushed and deformed. An outer surface of the exterior member 11 forms an exterior design surface of the hood 1.

The interior member 12 is a sheet member which forms an interior surface layer I of the hood 1 and which is made of a carbon-fiber-reinforced plastic. The thickness of the interior member 12 can be substantially the same as the thickness of the exterior member 11 and be set to, for example, 0.8 to 1.0 mm. Moreover, the elongation percentage of the interior member 12 can be substantially the same as the elongation percentage of the exterior member 11 and be set to, for example, 1.5% to 2.0%. Furthermore, the tensile strength of the interior member 12 can be substantially the same as the tensile strength of the exterior member 11 and be set to, for example, 300 to 1000 MPa. Moreover, the compressive strength of the interior member 12 can be substantially the same as the compressive strength of the exterior member 11 and be set to, for example, 240 to 800 MPa. Note that the thickness, the elongation percentage, the strength, and the like of the interior member 12 are not limited to the values described above and can be set, through experiments and the like, to values at which, in the collision with the impactor F to be described later, the exterior member 11 breaks at the point where the second intermediate member 14 is sufficiently crushed and deformed.

The intermediate member 13 is a sheet member which forms part of an intermediate layer M (energy absorption layer) sandwiched between the exterior surface layer E and the interior surface layer I of the hood 1 and which is made of, for example, an epoxy resin. The intermediate member 13 extends along the exterior member 11 and the interior member 12, and an upper surface of the intermediate member 13 is surface-bonded to a lower surface (back surface) of the exterior member 11. The thickness of the intermediate member 13 can be larger than the thickness of the exterior member 11 and the interior member 12 and be set to, for example, 2.0 to 3.0 mm. Moreover, the intermediate member 13 has a lower elongation percentage than the exterior member 11 and also has lower strength than the exterior member 11. The elongation percentage of the intermediate member 13 can be adjusted to be lower than, for example, 1.5% by adding, for example, 40 weight-percent of powder of minerals such as talc to the epoxy resin forming the intermediate member 13. Moreover, the tensile strength of the intermediate member 13 can be set to, for example, 50 to 200 MPa. The intermediate member 13 thereby breaks before the exterior member 11 does when deforming integrally with the exterior member 11. Note that the thickness, the elongation percentage, the strength, and the like of the intermediate member 13 are not limited to the values described above and can be set, through experiments and the like, to values at which the intermediate member 13 contributes to the stiffness of the shock absorption structure S1 as a whole by maintaining integrity with the exterior member 11 in an initial stage after the collision with the impactor F to be described later, and then breaks before the exterior member 11 does.

The second intermediate member 14 is placed between the intermediate member 13 and the interior member 12 and is a sheet cushion material forming part of the intermediate layer M (energy absorption layer) of the hood 1 together with the intermediate member 13. The second intermediate member 14 extends along the exterior member 11 and the interior member 12. An upper surface of the second intermediate member 14 is surface-bonded to a lower surface of the intermediate member 13, and a lower surface of the second intermediate member 14 is surface-bonded to an upper surface (back surface) of the interior member 12. The second intermediate member 14 is made of rubber or a foaming material such as urethane foam and has lower strength than the exterior member 11. For example, the tensile strength of the second intermediate member 14 can be set to 2 to 70 MPa. Accordingly, in the deformation of the exterior member 11 and the intermediate member 13, at least in a period from the start of integral deformation of the exterior member 11 and the intermediate member 13 to the breakage of the intermediate member 13 and the subsequent breakage of the exterior member 11, the second intermediate member 14 is compressed (crushed and deformed) in the thickness direction to receive the deformation of these members. The thickness of the second intermediate member 14 is larger than the thickness of the intermediate member 13 and can be set to, for example, 5.0 to 7.0 mm. Note that the thickness, the strength, and the like of the second intermediate member 14 are not limited to the values described above and can be set, through experiments and the like, to values at which, in the collision with the impactor F to be described later, the exterior member 11 breaks at the point where the second intermediate member 14 is sufficiently crushed and deformed. Specifically, the thickness and the strength of the second intermediate member 14 can be set to values at which the stress generated in the second intermediate member 14 does not reach the strength limit when the stress generated in the exterior member 11 reaches a stress level equal to the tensile strength or the compressive strength of the carbon-fiber-reinforced plastic due to the deformation caused by the collision with the impactor F.

The hood 1 can be formed such that the exterior member 11, the intermediate member 13, the second intermediate member 14, and the interior member 12 are stacked in this order with adhesive provided between each adjacent members, and are integrally formed by using a publicly-known forming method such as hot press forming or autoclave forming. Alternatively, the exterior member 11, the intermediate member 13, the second intermediate member 14, and the interior member 12 can be integrally formed by using a method (resin transfer molding method) in which fiber preforms being a base material of the exterior member 11 and the interior member 12 are sealed inside a mold together with the intermediate member 13 and the second intermediate member 14 and matrix resins of the exterior member 11 and the interior member 12 are injected into the mold in a pressurized manner.

Figure 3:
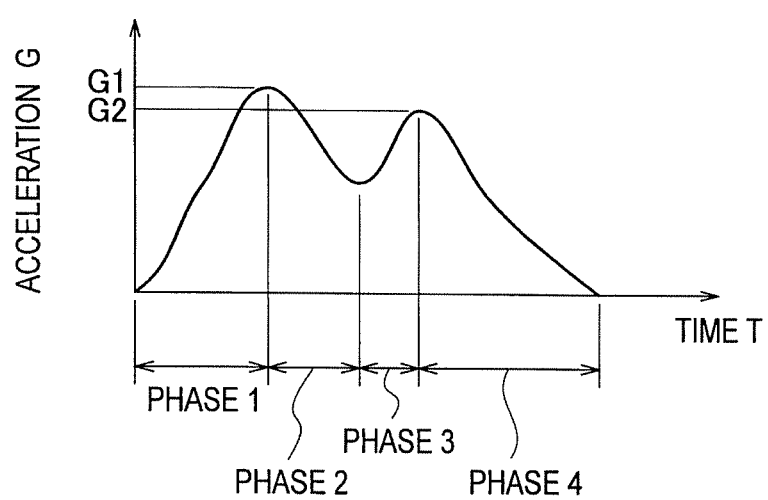
FIG. 3 is a graph depicting a temporal change of resultant acceleration which is applied to an impactor when the impactor is made to collide with the hood having the shock absorption structure in the first embodiment of the present invention.

Description is given below of an impact energy absorption process in the first embodiment with reference to FIGS. 3 and 4.

The impactor F used in a pedestrian protection test complying with the international standards (ISO/SC10/WG2) or the EU standards (EEVC/WG10) is made to collide with the hood 1 configured as described above at a predetermined angle and a predetermined speed, and resultant acceleration applied to the impactor F is measured by using an acceleration sensor provided in the impactor F. FIG. 3 is a graph depicting a temporal change of the measured resultant acceleration (also referred to as G-T curve).

[Phase 1]

When the impactor F collides with the surface of the hood 1, first, the exterior member 11 and the intermediate member 13 are elastically deformed such that an displacement amount is greatest at a contact point (hereafter, referred to as load point) P with the impactor F. In this deformation, since the intermediate member 13 extends along the exterior member 11 and the interior member 12 and is sandwiched between these members, the intermediate member 13 is deformed integrally with the exterior member 11. Meanwhile, since the second intermediate member 14 has lower strength than the exterior member 11 as described above, the second intermediate member 14 is crushed and deformed in the thickness direction (compressed in the thickness direction) in such a way as to receive the deformation of the exterior member 11 and the intermediate member 13 while applying resilient force to these members. In an initial stage after the start of input of the load, the displacement amount at the load point P is small, and the resilient force of the second intermediate member 14 is relatively small. Accordingly, restoring force (elastic force) of the exterior member 11 and the intermediate member 13 is mainly applied to the impactor F as reaction force. Moreover, the integrity among the exterior member 11, the intermediate member 13, the second intermediate member 14, and the interior member 12 is still maintained at this point, and the flexural rigidity of the shock absorption structure S1 as a whole is maintained due to the size of the cross-sectional area formed by the exterior member 11, the interior member 12, the intermediate member 13, and the second intermediate member 14. Accordingly, as illustrated in FIG. 3, the acceleration on the G-T curve tends to monotonically increase over time (along with an increase of the displacement of the exterior member 11 and the intermediate member 13).

Figure 4A:
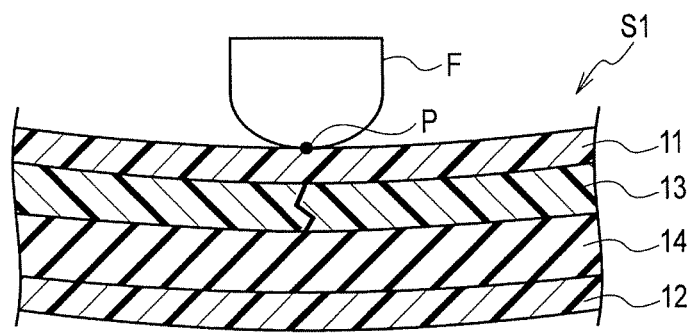
FIG. 4 is a view describing an impact energy absorption process in the first embodiment of the present invention.

Then, since the intermediate member 13 has a lower elongation percentage than the exterior member 11 and also has lower strength than the exterior member 11, the intermediate member 13 yields to elongating deformation and breaks before the exterior member 11 does, when the displacement amount at the load point P reaches a predetermined level, and a crack is formed in the intermediate member 13 as illustrated in FIG. 4(a). This breakage of the intermediate member 13 absorbs part of the impact energy.

[Phase 2]

When the crack is formed in the intermediate member 13, the reaction force applied to the impactor F decreases by an amount corresponding to the reaction force caused by the elastic force of the intermediate member 13. Accordingly, as illustrated in FIG. 3, the acceleration on the G-T curve decreases over time after reaching the first maximum value $G_1$ at the point where the crack is formed in the intermediate member 13.

Figure 4B:
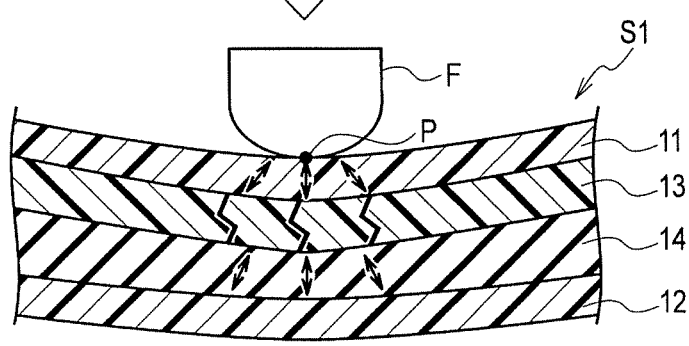

Moreover, when the crack is formed in the intermediate member 13, the load tends to be concentrated in the exterior member 11, and the displacement amount of the load point P further increases. Accordingly, the breakage of the intermediate member 13 still continues and more breakage portions are formed in the intermediate member 13 as illustrated in FIG. 4(b), thereby absorbing more energy. In this case, the reaction force applied to the impactor F does not increase and the acceleration on the G-T curve decreases as illustrated in FIG. 3. Moreover, the second intermediate member 14 is further crushed and deformed (compressed) in the thickness direction to receive the deformation of the exterior member 11 and the intermediate member 13.

[Phase 3]

Then, when the deformation amount of the second intermediate member 14 increases to a certain level and the resilient force thereof becomes relatively large, a larger portion of the load inputted from the impactor F is transmitted also to the interior member 12 via portions of the exterior member 11 and the intermediate member 13 near the load point P and a crushed-deformed portion of the second intermediate member 14 (see the arrows in FIG. 4(b)). Accordingly, the restoring force (elastic force) of the exterior member 11, the second intermediate member 14, and the interior member 12 is mainly applied to the impactor F as the reaction force.

When the crush-deformation amount of the second intermediate member 14 further increases, the inputted load is transmitted to the interior member 12 to be distributed over a wider range, and the restoring force (elastic force) of the interior member 12 over a wider range, that is greater reaction force acts on the impactor F. Accordingly, as illustrated in FIG. 3, the acceleration on the G-T curve increases again after dropping to the minimum value.

Figure 4C:
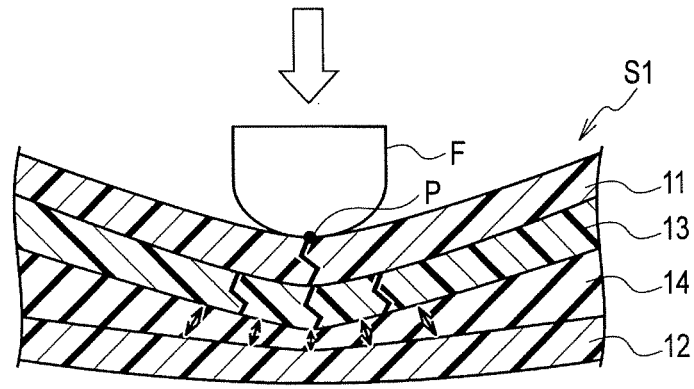

Thereafter, when the deformation further progresses, the stress generated in the exterior member 11 (stress mainly due to the bending load) reaches a stress level equal to the tensile strength or the compressive strength of the carbon-fiber-reinforced plastic, before the stress generated in the second intermediate member 14 reaches the strength limit. The exterior member 11 thereby breaks and a crack is formed in the exterior member 11 as illustrated in FIG. 4(c). This breakage of the exterior member 11 further absorbs the energy.

[Phase 4]

When the crack is formed in the exterior member 11, the reaction force applied to the impactor F decreases by an amount corresponding to the reaction force caused by the elastic force of the exterior member 11. Accordingly, as illustrated in FIG. 3, the acceleration on the G-T curve decreases over time after reaching the second maximum value $G_2$ at the point where the crack is formed in the exterior member 11.

Possible operations and possible effects of the first embodiment are described below. However, the first embodiment is not limited to the following operations and effects.

In the shock absorption structure S1 in the first embodiment, the intermediate member 13 extends along the exterior member 11 made of the carbon-fiber-reinforced plastic (first fiber-reinforced composite material) and the interior member 12 made of the carbon-fiber-reinforced plastic (second fiber-reinforced composite material) and is sandwiched between these members. Hence, the cross-sectional area of the shock absorption structure S1 is increased compared to the case where the shock absorption structure S1 includes only the exterior member 11 and the interior member 12, and the flexural rigidity of the shock absorption structure S as a whole can be increased. Moreover, the intermediate member 13 has a lower elongation percentage than the exterior member 11 and also has lower strength than the exterior member 11. When these members are bent and deformed integrally as a whole by an impact load toward the interior member 12 inputted to the exterior member 11, elongating deformation occurs in the exterior member 11, the interior member 12, and the intermediate member 13. However, in this deformation, since the intermediate member 13 has a lower elongation percentage and strength than the exterior member 11, the intermediate member 13 yields to the elongating deformation and breaks before the exterior member 11 does. In other words, the flexural rigidity of the shock absorption structure S1 as a whole is maintained at a high level in a period from the start of input of the impact load to the breakage of the intermediate member 13 (phase 1). Then, after the intermediate member 13 breaks to absorb the energy at the point where the displacement amount of the load point P reaches a predetermined level (a transition period from phase 1 to phase 2), the flexural rigidity of the shock absorption structure S1 as a whole is maintained until the exterior member 11 or the interior member 12 breaks, due to the size of the cross-sectional area formed by the exterior member 11, the interior member 12, and the intermediate member 13. Hence, the shock absorption structure S1 can efficiently absorb more energy.

Furthermore, the shock absorption structure S1 of the first embodiment further includes the second intermediate member 14 provided between the intermediate member 13 and the interior member 12. The second intermediate member 14 has lower strength than the exterior member 11. Accordingly, the second intermediate member 14 is compressed in the thickness direction before the exterior member 11 breaks due to the impact load inputted to the exterior member 11, and absorbs part of the impact energy. Hence, the shock absorption structure S1 can efficiently absorb more energy.

Moreover, since the shock absorption structure S1 in the first embodiment includes the second intermediate member 14 which is compressed in the thickness direction by the impact load inputted to the exterior member 11, it is possible to obtain a large displacement amount (deformation stroke) of the load point P in the deformation and absorb more energy. In addition, it is possible to secure sufficient thickness, that is cross-sectional area of the structure as a whole and improve the flexural rigidity as a whole.

In a hood in which multiple columnar ribs are provided between an outer panel and an inner panel as in the hood described in Patent Document 1, when the ribs are formed integrally with the outer panel and the inner panel, appearance defects may occur due to sink marks. Meanwhile, when the outer panel and the inner panel are each formed in advance to prevent these defects, the ribs needs to be installed between the formed outer panel and the formed inner panel by using adhesive or the like, and the productivity may decrease. In the shock absorption structure S1 in the first embodiment, since the exterior member 11, the intermediate member 13, the second intermediate member 14, and the interior member 12 are surface-bonded to one another, the exterior member 11, the intermediate member 13, the second intermediate member 14, and the interior member 12 can be integrally formed without causing the appearance defects in the exterior member 11. Hence, the productivity can be improved.

Moreover, since the shock absorption structure S1 in the first embodiment includes the second intermediate member 14 which is compressed in the thickness direction by the impact load inputted to the exterior member 11, the inputted impact load can be transmitted to the interior member 12 in a distributed manner. This can increase the magnitude of the second maximum value $G_2$ of the acceleration on the G-T curve or the ratio of the magnitude of the second maximum value $G_2$ to the magnitude of the first maximum value $G_1$ ($G_2/G_1$). Moreover, the magnitude of the second maximum value $G_2$ described above can be controlled by adjusting the strength and thickness of the second intermediate member 14.

Furthermore, since the exterior member 11, the intermediate member 13, the second intermediate member 14, and the interior member 12 are surface-bonded to one another in the shock absorption structure S in the first embodiment, the flexural rigidity of the shock absorption structure S1 as a whole can be further improved.

Next, a second embodiment of the present invention is described. A shock absorption structure S2 in the second embodiment is different from the shock absorption structure S1 in the first embodiment mainly in the following two points. Specifically: the intermediate layer M (energy absorption layer) sandwiched between the exterior surface layer E and the interior surface layer I of the hood 1 is formed only of the intermediate member 13 in the first embodiment and no portion corresponding to the second intermediate member 14 exists in the intermediate layer M; and the interior member 12 forming the interior surface layer I of the hood 1 is made not of the carbon-fiber-reinforced plastic but of a glass-fiber-reinforced plastic and can be thus elongated to a greater degree than the exterior member 11. Other constitutional elements are the same as the corresponding constitutional elements in the first embodiment. Accordingly, the same elements are denoted by the same reference numerals and detailed description thereof is omitted.

Figure 5:
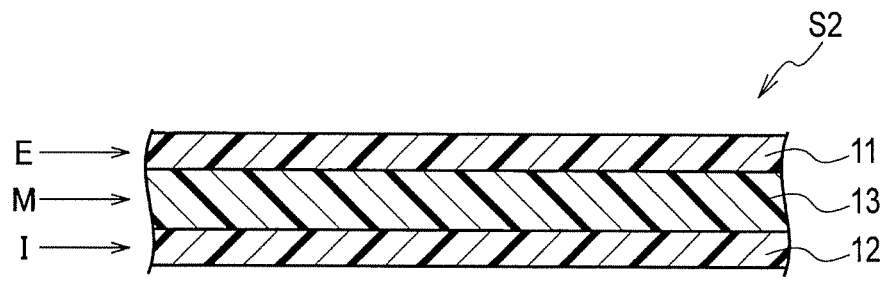
FIG. 5 is a cross-sectional view of a hood having a shock absorption structure in a second embodiment of the present invention.

FIG. 5 is a cross-sectional view of the hood 1 having the shock absorption structure S2 of the second embodiment.

As illustrated in FIG. 5, the hood 1 has, as the shock absorption structure S2, the exterior member 11, the interior member 12 which is arranged opposite to the exterior member 11, and the intermediate member 13 which is arranged between the exterior member 11 and the interior member 12.

The exterior member 11 is a sheet member which forms an exterior surface layer E of the hood 1 and which is made of a carbon-fiber-reinforced plastic. The thickness, the elongation percentage, the strength, and the like of the exterior member 11 can be set to the same values as those in the first embodiment. Note that these values are not limited to particular values and can be set, through experiments and the like, to values at which, in collision with the impactor F to be described later, the exterior member 11 breaks after the intermediate member 13 breaks.

The interior member 12 is a sheet member which forms an interior surface layer I of the hood 1 and which is made of a glass-fiber-reinforced plastic. The thickness of the interior member 12 can be substantially the same as the thickness of the exterior member 11 and be set to, for example, 0.8 to 1.0 mm. Meanwhile, the elongation percentage of the interior member 12 is set to be greater than the elongation percentage of the exterior member 11 which is 1.5% to 2.0%. Specifically, the elongation percentage of the interior member 12 can be set to, for example, 4.8% to 6.1%. The tensile strength of the interior member 12 can be substantially the same as the tensile strength of the exterior member 11 and be set to, for example, 250 to 900 MPa. Note that the thickness, the elongation percentage, the strength, and the like of the interior member 12 are not limited to the values described above and can be set, through experiments and the like, to values at which the exterior member 11 breaks after the intermediate member 13 breaks due to the collision with the impactor F to be described later.

The intermediate member 13 is a sheet member which forms the intermediate layer M (energy absorption layer) sandwiched between the exterior surface layer E and the interior surface layer I of the hood 1 and which is made of, for example, an epoxy resin. The intermediate member 13 extends along the exterior member 11 and the interior member 12. An upper surface of the intermediate member 13 is surface-bonded to a lower surface (back surface) of the exterior member 11, and a lower surface of the intermediate member 13 is surface bonded to an upper surface (back surface) of the interior member 12. The thickness of the intermediate member 13 is larger than the thickness of the exterior member 11 and the interior member 12 and can be set to, for example, 2.0 to 3.0 mm. Moreover, the intermediate member 13 has a lower elongation percentage than the exterior member 11 and also has lower strength than the exterior member 11. The elongation percentage of the intermediate member 13 can be adjusted to be lower than, for example, 1.5% by adding, for example, powder of minerals such as talc by 40 weight percent to the epoxy resin forming the intermediate member 13. Moreover, the tensile strength of the intermediate member 13 can be set to, for example, 50 to 200 MPa. The intermediate member 13 thereby breaks before the exterior member 11 does when deforming integrally with the exterior member 11. Note that the thickness, the elongation percentage, the strength, and the like of the intermediate member 13 are not limited to the values described above and can be set, through experiments and the like, to values at which the intermediate member 13 contributes to the stiffness of the shock absorption structure S2 as a whole by maintaining integrity with the exterior member 11 and the interior member 12 in an initial stage after the collision with the impactor F to be described later and then breaks before the exterior member 11 does.

Figure 6:
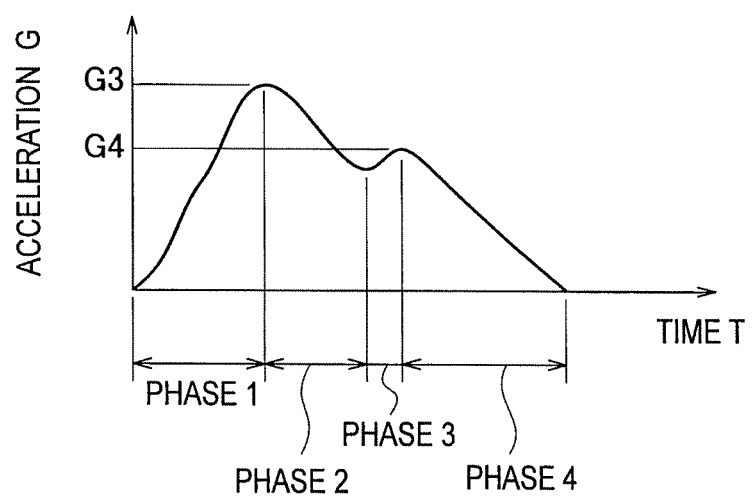
FIG. 6 is a graph depicting a temporal change of resultant acceleration which is applied to an impactor when the impactor is made to collide with the hood having the shock absorption structure in the second embodiment of the present invention.
Figure 7:
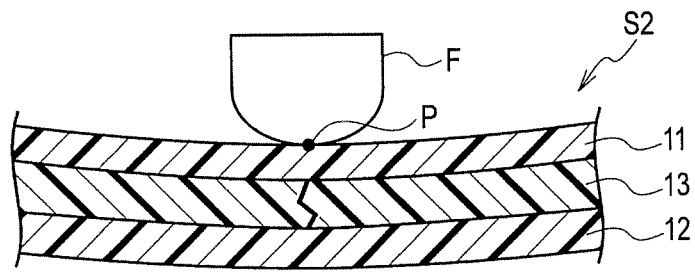
FIG. 7 is a view describing an impact energy absorption process in the second embodiment of the present invention.
Figure 7:
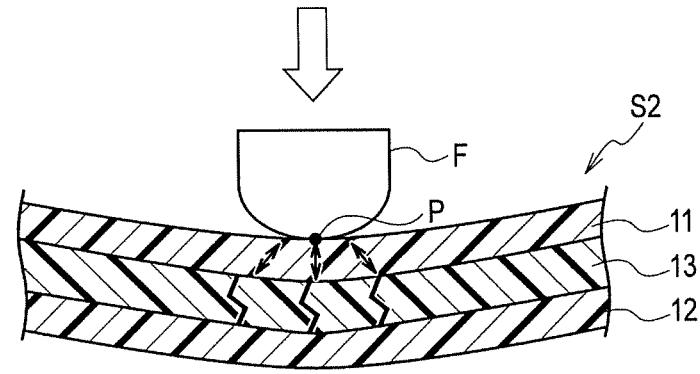
Figure 7:
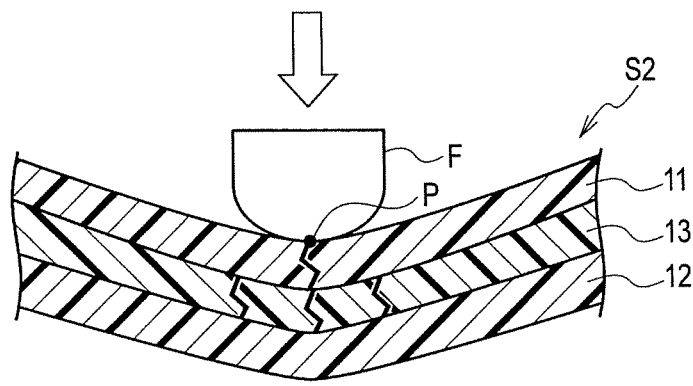

Description is given below of an impact energy absorption process in the second embodiment with reference to FIGS. 6 and 7.

The aforementioned impactor F is made to collide with the hood 1 configured as described above at a predetermined angle and a predetermined speed, and resultant acceleration applied to the impactor F is measured. FIG. 6 is a graph depicting a temporal change of the measured resultant acceleration (also referred to as G-T curve).

[Phase 1]

When the impactor F collides with the surface of the hood 1, first, elastic deformation occurs such that displacement amount is greatest at a contact point (hereafter, referred to as load point) P with the impactor F. In this deformation, the intermediate member 13 maintains a state in which the intermediate member 13 extends along the exterior member 11 and the interior member 12 and is sandwiched between these members. Specifically, the intermediate member 13 is deformed integrally with the exterior member 11 and the interior member 12, and the flexural rigidity of the shock absorption structure S2 as a whole is maintained due to the size of the cross-sectional area formed by the exterior member 11, the interior member 12, and the intermediate member 13. Accordingly, restoring force (elastic force) of the exterior member 11, the intermediate member 13, and the interior member 12 as a whole is applied to the impactor F as reaction force and, as illustrated in FIG. 6, the acceleration on the G-T curve tends to monotonically increase over time (along with an increase of the displacement described above).

Since the intermediate member 13 has a lower elongation percentage than the exterior member 11 and also has lower strength than the exterior member 11, the intermediate member 13 yields to elongating deformation and breaks before the exterior member 11 does, at a point where the displacement amount at the load point P reaches a predetermined level, and a crack is formed in the intermediate member 13 as illustrated in FIG. 7(a). This breakage of the intermediate member 13 absorbs part of the impact energy.

[Phase 2]

When the crack is formed in the intermediate member 13, the reaction force applied to the impactor F decreases by an amount corresponding to the reaction force caused by the elastic force of the intermediate member 13. Accordingly, as illustrated in FIG. 6, the acceleration on the G-T curve decreases over time after reaching the first maximum value $G_3$ at the point where the crack is formed in the intermediate member 13.

Moreover, when the crack is formed in the intermediate member 13, the flexural rigidity of the shock absorption structure S2 as a whole decreases. In addition, since the elongation percentage of the interior member 12 is set to be higher than the elongation percentage of the exterior member 11, the bending load tends to be concentrated in the exterior member 11 and the displacement amount of the load point P further increases. Accordingly, the breakage of the intermediate member 13 still continues and more breakage portions are formed in the intermediate member 13 as illustrated in FIG. 7(b), thereby absorbing more energy. In this case, the reaction force applied to the impactor F does not increase and the acceleration on the G-T curve decreases as illustrated in FIG. 6.

[Phase 3]

When the breakage of the intermediate member 13 progresses and the displacement amount of the load point P increases to a certain level, the restoring force (elastic force) of each of the exterior member 11 and the interior member 12 increases and resultant force of these forces is applied to the impactor F as the reaction force. Accordingly, as illustrated in FIG. 6, the acceleration on the G-T curve increases again over time after dropping to the minimum value.

Thereafter, when the deformation further progresses, the stress generated in the exterior member 11 (stress mainly due to the bending load) reaches a stress level equal to the tensile strength or the compressive strength of the carbon-fiber-reinforced plastic, before the stress generated in the interior member 12 reaches the strength limit. The exterior member 11 thereby breaks and a crack is formed in the exterior member 11 as illustrated in FIG. 7(c). This breakage of the exterior member 11 further absorbs the energy.

[Phase 4]

When the crack is formed in the exterior member 11, the reaction force applied to the impactor F decreases by an amount corresponding to the reaction force caused by the elastic force of the exterior member 11. Accordingly, as illustrated in FIG. 6, the acceleration on the G-T curve decreases over time after reaching the second maximum value $G_4$ at the point where the crack is formed in the exterior member 11.

Possible operations and possible effects of the second embodiment are described below. However, the second embodiment is not limited to the following operations and effects.

In the shock absorption structure S2 in the second embodiment, the intermediate member 13 extends along the exterior member 11 made of the carbon-fiber-reinforced plastic (first fiber-reinforced composite material) and the interior member 12 made of the glass-fiber-reinforced plastic (second fiber-reinforced composite material) and is sandwiched between these members. Hence, the cross-sectional area of the shock absorption structure S2 is increased compared to the case where the shock absorption structure S2 includes only the exterior member 11 and the interior member 12, and the flexural rigidity of the shock absorption structure S2 as a whole can be increased. Moreover, the intermediate member 13 has a lower elongation percentage than the exterior member 11 and also has lower strength than the exterior member 11. When these members are bent and deformed integrally as a whole by an impact load toward the interior member 12 inputted to the exterior member 11, elongating deformation occurs in the exterior member 11, the interior member 12, and the intermediate member 13. However, in this deformation, since the intermediate member 13 has a lower elongation percentage and strength than the exterior member 11, the intermediate member 13 yields to the elongating deformation and breaks before the exterior member 11 does. In other words, the flexural rigidity of the shock absorption structure S2 as a whole is maintained at a high level in a period from the start of input of the impact load to the breakage of the intermediate member 13 (phase 1). Then, after the intermediate member 13 breaks to absorb the energy at the point where the displacement amount of the load point P reaches a predetermined level (a transition period from phase 1 to phase 2), the flexural rigidity of the shock absorption structure S2 as a whole is maintained until the exterior member 11 or the interior member 12 breaks, due to the size of the cross-sectional area formed by the exterior member 11, the interior member 12, and the intermediate member 13. Hence, the shock absorption structure S2 can efficiently absorb more energy.

Furthermore, in the shock absorption structure S2 in the second embodiment, since the exterior member 11, the intermediate member 13, and the interior member 12 are surface-bonded to one another, the exterior member 11, the intermediate member 13, and the interior member 12 can be integrally formed without causing appearance defects in the exterior member 11 as described above. Hence, the productivity can be improved.

Moreover, in the shock absorption structure S2 in the second embodiment, since the elongation percentage of the interior member 12 is higher than the elongation percentage of the exterior member 11, the bending load can be concentrated in the exterior member 11 after the first breakage of the intermediate member 13. This can cause the breakage of the intermediate member 13 to occur continuously and also cause the exterior member 11 to break before the interior member 12 does. Hence, efficiency of the impact energy absorption can be improved.

Furthermore, in the shock absorption structure S2 in the second embodiment, since the exterior member 11, the intermediate member 13, and the interior member 12 are surface-bonded to one another, the flexural rigidity of the shock absorption structure S2 as a whole can be further improved.

Although the embodiments of the present invention have been described above, these embodiments are merely examples described to facilitate the understanding of the present invention, and the present invention is not limited to these embodiments. The technical scope of the present invention is not limited to the specific technical matters disclosed in the aforementioned embodiments and includes various changes, modifications, alternative techniques, and the like which can be easily derived from the specific technical matters.

For example, in one or more of the aforementioned embodiments, description is given of the examples in which the shock absorption structure according to one or more embodiments of the present invention is applied to the outer panel member of the automobile. However, the shock absorption structure according to one or more embodiments of the present invention can be applied also to ships, aircrafts, and the like, in addition to vehicles which travel on roads, tracks, or premises of factories.

In one or more of the aforementioned embodiments, description is given of the examples in which the carbon-fiber-reinforced plastic or the glass-fiber-reinforced plastic is used as each of the materials of the exterior member 11 and the interior member 12. However, the materials of the exterior member 11 and the interior member 12 are not limited to these materials. In addition to the carbon fibers and the glass fibers, for example, polyaramide fibers, alumina fibers, silicon carbide fibers, boron fibers, silicon carbide fibers, and the like can used as the reinforcement fibers. Moreover, for example, polyacrylonitrile-based (PAN-based) carbon fibers, pitch-based carbon fibers, cellulose-based carbon fibers, vapor-grown carbon fibers using hydrocarbons, graphite fibers, and the like can be used as the carbon fibers. Two or more types of these fibers may be combined and used. Moreover, the form of the reinforcement fibers may be continuous reinforcement fibers, discontinuous reinforcement fibers, or combination of these fibers. The continuous reinforcement fibers may be unidirectional reinforcement fibers or woven reinforcement fibers. However, in order to obtain a stable shock absorption performance, according to one or more embodiments of the present invention, the form of the reinforcement fibers is a form which can provide isotropic characteristics to the exterior member 11 and the interior member 12. A publicly-known thermosetting resin or thermoplastic resin can be used as the matrix resin. Specifically, epoxy resins, phenol resins, unsaturated polyester resins, vinyl-ester resins, polycarbonate resins, polyester resins, polyamide (PA) resins, liquid-crystal polymer resins, polyethersulfone resins, polyether ether ketone resins, polyarylate resins, polyphenylene ether resins, polyphenylene sulfide (PPS) resins, polyacetal resins, polysulfone resins, polyimide resins, polyetherimide resins, polyolefin resins, polystyrene resins, modified polystyrene resins, AS resins (copolymer of acrylonitrile and styrene), ABS resins (copolymer of acrylonitrile, butadiene, and styrene), modified ABS resins, MBS resins (copolymer of methyl methacrylate, butadiene, and styrene), modified MBS resins, polymethyl methacrylate (PMMA) resins, modified polymethyl methacrylate resins, and the like.

In one or more of the embodiments described above, the epoxy resin to which the powder of minerals is added is given as the material of the intermediate member 13. However, the type of the resin of the intermediate member 13 is not particularly limited. For example, the material of the intermediate member 13 may be a material obtained by adding minerals to a thermosetting resin or thermoplastic resin generally used as a matrix of a carbon-fiber-reinforced plastic, such as polyphenylene sulfide (PPS) or unsaturated polyester.

One or more embodiments of the present invention may provide a shock absorption structure which can improve in flexural rigidity and increase the energy absorption amount and a vehicle outer panel member having this structure.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

REFERENCE SIGNS LIST

S1, S2 shock absorption structure
11 exterior member
12 interior member
13 intermediate member
14 second intermediate member

The invention claimed is:

1. A shock absorption structure comprising:
an exterior member made of a first fiber-reinforced composite material;
an interior member made of a second fiber-reinforced composite material;
a first intermediate member consisting of resin, extending along the exterior member and the interior member, and sandwiched between the exterior member and the interior member; and
a second intermediate member provided between the first intermediate member and the interior member,
wherein the first intermediate member has a lower elongation percentage than the exterior member,
wherein the first intermediate member has lower tensile strength than the exterior member, and
wherein the second intermediate member has lower tensile strength than the exterior member.

2. The shock absorption structure according to claim 1, wherein the exterior member, the first intermediate member, the second intermediate member, and the interior member are surface-bonded to one another.

3. The shock absorption structure according to claim 1, wherein at least the exterior member and the interior member are configured to be bent and deformed integrally by an impact load toward the interior member inputted to the exterior member, and
wherein the first intermediate member is configured to yield to an elongating deformation and break before the exterior member yields to the elongating deformation and breaks.

4. A vehicle outer panel member having the shock absorption structure according to claim 1.

5. A shock absorption structure comprising:
an exterior member made of a first fiber-reinforced composite material;
an interior member made of a second fiber-reinforced composite material;
a first intermediate member consisting of resin and mineral, extending along the exterior member and the interior member, and sandwiched between the exterior member and the interior member; and
a second intermediate member provided between the first intermediate member and the interior member,
wherein the first intermediate member has a lower elongation percentage than the exterior member,
wherein the first intermediate member has lower tensile strength than the exterior member, and
wherein the second intermediate member has lower tensile strength than the exterior member.

6. A shock absorption structure comprising:
an exterior member made of a first fiber-reinforced composite material;
an interior member made of a second fiber-reinforced composite material;
a first intermediate member consisting of resin, extending along the exterior member and the interior member, and sandwiched between the exterior member and the interior member; and
a second intermediate member provided between the first intermediate member and the interior member,
wherein the first intermediate member has a lower elongation percentage than the exterior member,
wherein the first intermediate member has lower tensile strength than the exterior member,
wherein the second intermediate member has lower tensile strength than the exterior member,
wherein at least the exterior member and the interior member are configured to be bent and deformed integrally by an impact load toward the interior member inputted to the exterior member,
wherein the first intermediate member is configured to yield to an elongating deformation and break before the exterior member yields to the elongating deformation and breaks, and
wherein the second intermediate member is configured to be crushed and deformed in the thickness direction by the impact load.

7. A shock absorption structure comprising:
an exterior member made of a first fiber-reinforced composite material;
an interior member made of a second fiber-reinforced composite material; and
a first intermediate member consisting of resin and mineral, extending along the exterior member and the interior member and sandwiched between the exterior member and the interior member;
wherein the first intermediate member has a lower elongation percentage than the exterior member,
wherein the first intermediate member has lower tensile strength than the exterior member,
wherein the interior member has a higher elongation percentage than the exterior member,
wherein at least the exterior member and the interior member are configured to be bent and deformed integrally by an impact load toward the interior member inputted to the exterior member, and
wherein the first intermediate member is configured to yield to an elongating deformation and break before the exterior member yields to the elongating deformation and breaks.

* * * * *